May 3, 1938. G. F. CONNELLY Re. 20,711

TIRE TREAD SPLITTING APPARATUS

Original Filed April 12, 1933 3 Sheets-Sheet 1

INVENTOR.
GEORGE F. CONNELLY
BY Lincoln Johnson
ATTORNEY

May 3, 1938. G. F. CONNELLY Re. 20,711

TIRE TREAD SPLITTING APPARATUS

Original Filed April 12, 1933 3 Sheets-Sheet 2

INVENTOR.
GEORGE F. CONNELLY
BY
ATTORNEY

TIRE TREAD SPLITTING APPARATUS

Original Filed April 12, 1933 3 Sheets-Sheet 3

INVENTOR.
GEORGE F. CONNELLY
BY Lincoln Johnson
ATTORNEY

Reissued May 3, 1938

Re. 20,711

UNITED STATES PATENT OFFICE 20,711

TIRE TREAD SPLITTING APPARATUS

George F. Connelly, San Francisco, Calif., assignor to The Capital National Bank, Sacramento, Calif., a banking corporation Original No. 1,945,883, dated February 6, 1934, Serial No. 665,775, April 12, 1933. Application for reissue April 29, 1936, Serial No. 77,072

14 Claims. (Cl. 164—35)

This invention relates particularly to an apparatus for splitting or severing the worn tread surface from a pneumatic tire while maintaining the said tire in its circular form.

An object of the invention is to provide an apparatus adapted particularly to split or remove the worn rubber tread of a pneumatic tire from the carcass of the tire, preliminarily to retreading the carcass.

A further object of the invention is to provide an apparatus for removing the tread surface of a pneumatic tire which will, by continuous operation, automatically cut any selected thickness of the worn tread surface from the tire, means being provided in the apparatus to maintain the normal tread surface of the tire in a flattened position during the period of time in which the said tread surface is being split from the carcass.

Other objects and advantages are to provide an apparatus for removing the treads from tires that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
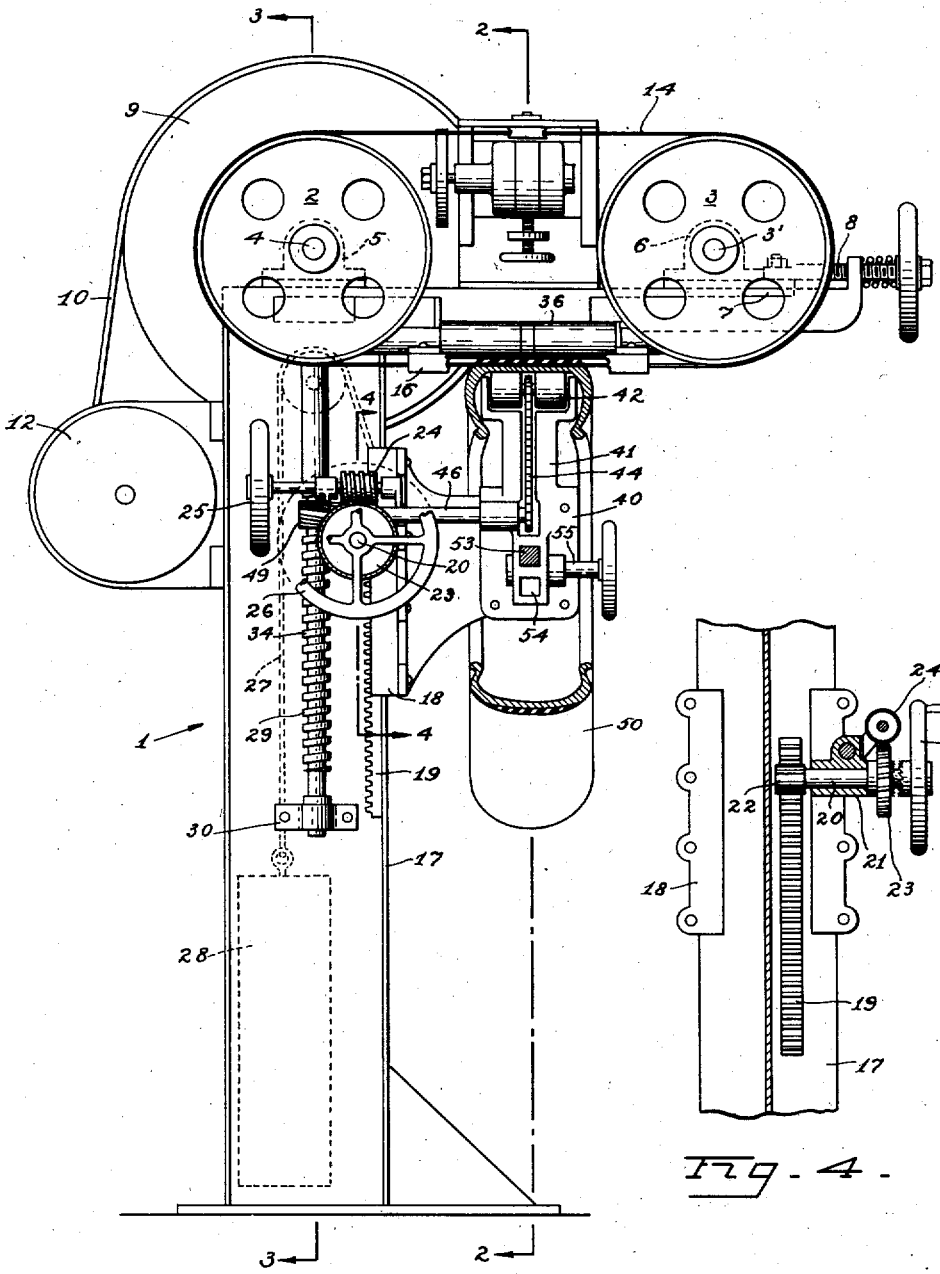
Fig. 1 represents a front elevation of a tire tread splitting apparatus constructed in accordance with my invention, a portion thereof being broken away to show the interior construction thereof.
Figure 4:
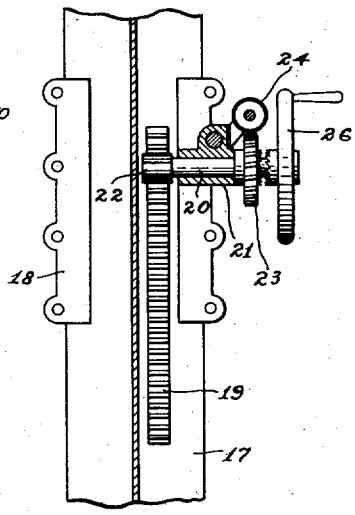
Fig. 4 is a fragmentary view taken on the line 4—4 of Fig. 1.
Figure 2:
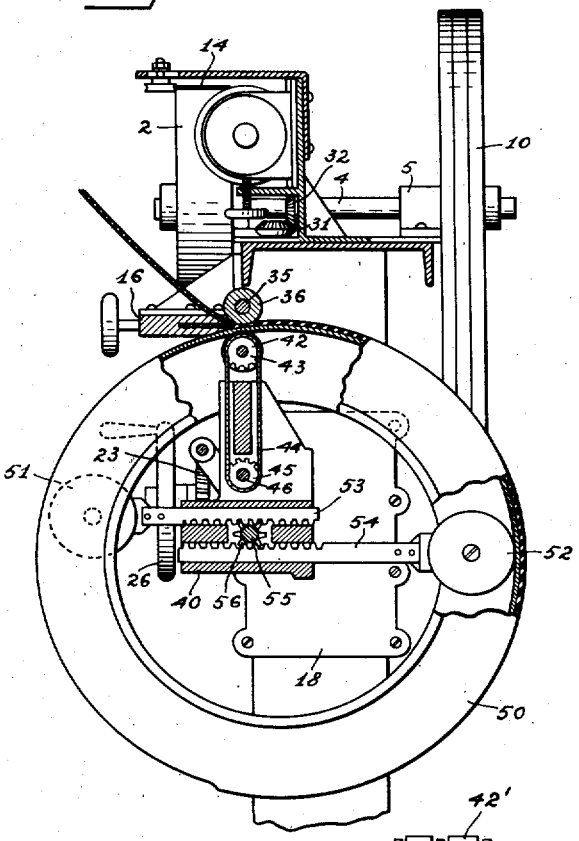
Fig. 2 is a side elevation of Fig. 1, a portion of this view being in section to show the interior construction, said view being taken substantially on the line 2—2 of Fig. 1.

In the art of stripping or removing tread surfaces from pneumatic tires, to put said tires in condition to be retreaded, it is customary practice to either cut the worn tread surface from the tire by hand, or to scrape the same off, or remove it by abrasive wheels, all of which methods depend entirely on the hand work and skill of the operator to effect removal of the tread surface, and as a result there is not a uniformity of product. My apparatus is designed to eliminate the hand work usually involved in removing the tread surface from the tire, and to perform the entire operation mechanically, with the result that the finished product is uniform, and the cost of removing the tread surface, as well as the period of time necessary to effect removal of said tread surface, is materially reduced below both the cost and time accruing where the tread removal is effected by hand.

In detail the construction illustrated in the drawings comprises a frame of the tire splitting machine which is generally designated by the numeral 1, and which includes the foundation structure on which all of the operating parts of the machine are mounted. A pair of pulleys 2 and 3 are arranged in spaced relation upon the upper side of the frame 1, each of said pulleys being supported on shafts, the axes of which are horizontally disposed. The pulley shaft 4 is rotatably supported in a fixed bearing 5, while the pulley shaft 3′ is rotatably supported in a bearing 6 which is slidably guided on a trackway 7 on the upper part of the frame 1. The shaft bearing 6 is adjustable on the frame through the instrumentality of the threaded shaft 8 having a hand wheel thereon, whereby the position of the pulley 3 relative to the pulley 2 may be regulated as desired. A pulley 9 is mounted on the other end of the shaft 4, said pulley 9 being drivingly connected by a belt 10 to a pulley 11 on the shaft of a driving motor 12.

A band knife 14 is mounted around the peripheries of the pulleys 2 and 3, and the lower run of said knife, between the pulleys 2 and 3, is confined within a guideway 15 formed in a guide member 16, mounted adjacent the upper side of the frame 1. The housing 16 is formed in separable halves 16a and 16b, which halves are bolted together adjacent their opposite ends. The side of the housing 16 which faces the tire to be cut or split, is tapered or beveled as shown at 16c. A pair of like members 16d are recessed into the beveled side of the housing to guide and support the band knife at the cutting edge. The inserts 16d are cut on a taper which corresponds approximately to the cutting edge of the band knife, and the inserts may be sharpened or replaced in a relatively simple manner.

The interior of each of the separable halves 16a and 16b are hollowed out as at 16g to receive spaced rollers 16e and 16f. Each of the rollers is rotatably mounted in a frame 16h slidably confined in the recess 16g. A threaded shaft 16j is mounted in the housing 16 to engage the frame 16h, for the purpose of advancing or withdrawing the rollers 16e and 16f toward or away from the rear edge of the band knife 14. As the cutting edge of the band knife may become worn through continuous cutting operations, the rollers 16e and 16f permit the said knife to be advanced and kept at the proper point for efficient cutting operation. The housing 16 supports the lower run of the band knife on a true horizontal plane at the point where the knife is cutting the worn tread surface from a tire, as will be hereinafter described.

The vertically disposed portion of the frame 1 is provided with a guideway 17 thereon, on which a slide 18 is confined. A gear rack 19 is arranged in vertical relation on the guide 17. A shaft 20 journaled in a bearing 21 on the slide 18 has a pinion 22 on an end thereof which meshes with the gear rack 19. The shaft 20 has a worm wheel 23 rotatably mounted thereon in meshing engagement with a worm 24 journaled on the slide 18, said worm 24 having a hand wheel 25 thereon for rotating the worm wheel 23 and the pinion 22 which meshes with the gear rack 19 for raising or lowering the slide 18 on the guideway 17. The shaft 20 is also provided with a hand wheel 26 slidably splined thereon.

The hand wheel 26 is slidable axially on the shaft 21 to engage or disengage with the worm wheel 23. When the hand wheel 26 is declutched from the worm wheel 23, it is possible to raise or lower the slide 18 relative to the gear rack much faster than by raising or lowering the same through the worm and worm wheel. When the hand wheel 26 is clutched with the worm wheel, then it becomes possible by rotating the hand wheel 25 and the worm 24, to obtain a micrometric movement of the slide 18. When the hand wheel 26 is in clutching engagement with the worm wheel 23, the worm 24 thereon acts as a brake or lock to stop indiscriminate rotation of the shaft 20 and thus holds the slide 18 at any set position. The slide 18 is connected by a cable 27 to a counterweight 28, which counterweight counterbalances the weight of the slide 18 and the operating mechanism which is mounted thereon, as will be hereinafter explained.

A driving screw or worm 29 is supported in vertical position in bearings 30 on the frame 1, said driving screw 29 having a bevel pinion 31 on its upper end in meshing engagement with a bevel pinion 32 on the pulley shaft 4. The drive screw 29 is thus coupled directly to the pulley shaft and is rotated in unison therewith. The screw or worm 33 at the upper end of the shaft 29 has a left hand pitch, while the screw or worm 34 at the lower end of said shaft has a right hand pitch.

A shaft 35 is journaled in bearings adjacent the upper side of the frame 1, said shaft 35 having a corrugated feed roller 36 securely mounted thereon. The shaft 35 has a worm 37 on an end thereof which meshes with the threaded portion 33 on the shaft 29, to drive said shaft in a clockwise direction. The feed roller 36 is arranged in front of and above the upper half of the housing 16 within which the band knife 14 is confined. The shaft 35 lies on a horizontal plane and parallels the plane of the lower run of the band knife 14. A line drawn on the vertical through the axis of the feed roller 36 approximately intersects the cutting edge of the band knife 14.

The slide 18 is provided with an extension arm 40 having a vertically disposed bracket 41 on the outer end of said arm. A feed roller 42 is journaled at its opposite ends in the upper end of the bracket 41, the horizontal axis of rotation of the feed roller 42 lying in the same vertical plane as the horizontal axis of the upper feed roller 36. The center portion of the feed roller 42 is reduced in diameter to receive a sprocket 43 therein. A sprocket chain 44 meshes with the sprocket 43 and with a sprocket 45 fixed on the end of a shaft 46, said shaft 46 being journaled at its opposite ends in bearings 47 and 48 formed respectively on the bracket 41 and the bearing 21. The shaft 46 is provided with a worm 49 on the other end thereof, which worm meshes with the threaded portion 34 on the drive shaft 29. The worm 49 thus drives the shaft 46 and the lower feed roller 42 in a counterclockwise direction.

The apparatus operates as follows: A pneumatic tire from which the worn tread surface is to be split or severed, is placed in a vertical hanging position, having the lower feed roller 42 inserted within the interior of the tire, whereby the said tire is supported on said feed roller. The slide 18 is then raised by means of the gear rack heretofore described, until the upper or tread surface of the tire is brought into contact with the underside of the upper feed roller 36. As the lower feed roller raises the tread portion of the tire into contact with the upper feed roller, the tread surface of the tire is gradually flattened out until practically the entire tread surface thereof lies on a horizontal plane. When the tread surface of the tire is thus squeezed between the rollers, it lies immediately in front of the cutting edge of the band knife. The thickness of the tread surface to be split from the tire, or the depth of the cut to be made by the band knife, is regulated by the extent of the compressing force applied to the tire in squeezing the tire between the upper and lower feed rolls.

The upper feed roller 36 is formed with a corrugated periphery, the center section thereof being made of metal and the opposite end sections of rubber. The lower feed roller 42 forces the tread surface of the tire against the bottom surface of the upper feed roller 36 and the act of compressing the tread section between said rollers will, in some cases, cause the non-metal section on the roller 36 to yield to accommodate the tread surface of the tire, thus enabling the band knife to cut the extreme edges of the tread surface from the tire.

The upper feed roller 36 and the lower feed roller 42 cause the tire carcass to be rotated or fed toward the cutting edge of the band knife. During the splitting operation the band knife 14 moves continuously, as does the tire carcass 50, and by gradually adjusting the extent of contact of the band knife with the tire carcass, it is possible to remove as much of the tread surface of the tire carcass in a single operation, as may be desired, and with the assured result that the said tire carcass will have had a uniform amount of tread surface removed therefrom around the entire circumference thereof.

The tire 50 is supported in a vertical position during the cutting operation by means of substantially spherical guide rollers 51 and 52, which are inserted within the interior of the tire on diametrically opposite sides thereof. The rollers 51 and 52 are rotatably mounted on the ends of gear racks 53 and 54 respectively, said gear racks being confined to movement in a horizontal direction in the slide arm 40. A shaft 55 is journaled in the arm 40 and has a sprocket 56 thereon meshing with the rack arms 53 and 54, whereby the rollers 51 and 52 may be advanced into and from position within the interior of the tire carcass. The rollers 51 and 52 when extended into the tire, prevent any lateral deflection of the tire during the splitting operation. Upon the completion of the splitting operation and after a sufficient amount of tread surface has been removed from the tire, the slide 18 would be lowered on the guideway 17, to drop the feed rollers apart, after which the guide rollers 51 and 52 would be withdrawn from the interior of the tire carcass, and the tire would be removed in readiness to have a new tread surface vulcanized thereon. With my apparatus, the tread surface of the tire is removed therefrom without deforming or mutilating the natural shape of the tire. To enable the tire to be retreaded, it is necessary from a mechanical standpoint, that the tire be not deformed or otherwise misshapen, and by using my splitting apparatus it is possible to cut the worn tread from the tire carcass, and at the same time to not destroy the original shape of the tire.

It is desirable in the preparation of a tire to be retreaded that the old tread surface be removed and that the surfaces of the side walls of the tire retain their original covering of rubber which is ordinarily not subject to abrasive wear. It is also desirable and necessary to obtain the best and most uniform results in applying the new tread surface that the edge of the cut away portion of the old tread be tapered or gradually reduced in thickness so that the tire presents a substantially smooth surface for the application of rubber that is to be vulcanized thereon to form the new tread surface. This manner of removing the old tread is accomplished in an efficient and simple manner with my invention as may be seen from Fig. 1 of the drawings. As illustrated in Fig. 1 that portion of the knife which is performing the cut is perfectly straight and passes through the tread of the tire on a straight line. However, due to the fact that the portion of the tire being cut by the knife is constrained by the rollers 36 and 42 to lie flat and the adjacent side walls curve away from the rollers, the portion cut away is actually curved and gradually tapered at its edges. A typical section of the cut away portion and the shape of the tire from which it has been cut is illustrated in the view of the tire in section directly beneath the point where the knife is shown in Fig. 1. Thus, while I employ a perfectly straight knife for cutting the tire, the result of the cut is a curved surface which merges gradually rather than abruptly into the uncut surface of the side walls.

Although I have shown and described an endless band knife for use in cutting the worn tread from the tire carcass, it is to be understood that a reciprocating knife might be substituted in lieu thereof. Likewise, the upper feed roller 36 may be part rubber and part metal as described, altho it would be clearly within the purview of the invention to form it throughout the entire length of metal. I have found also that on small sized tires, the lower feed roller 42 need not be driven.

Figure 10:
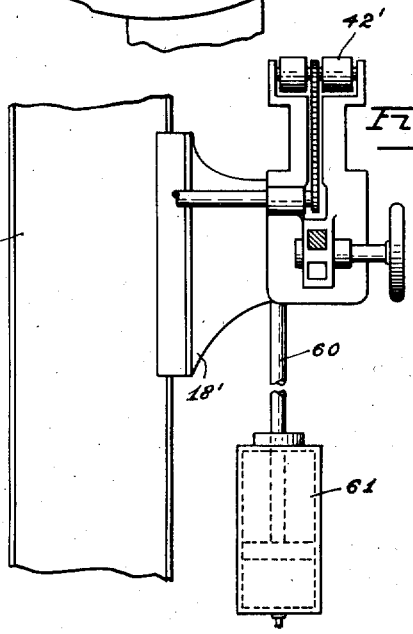
Fig. 10 is a fragmentary view showing a modified form of apparatus for raising and lowering the lower feed roller.
Figure 3:
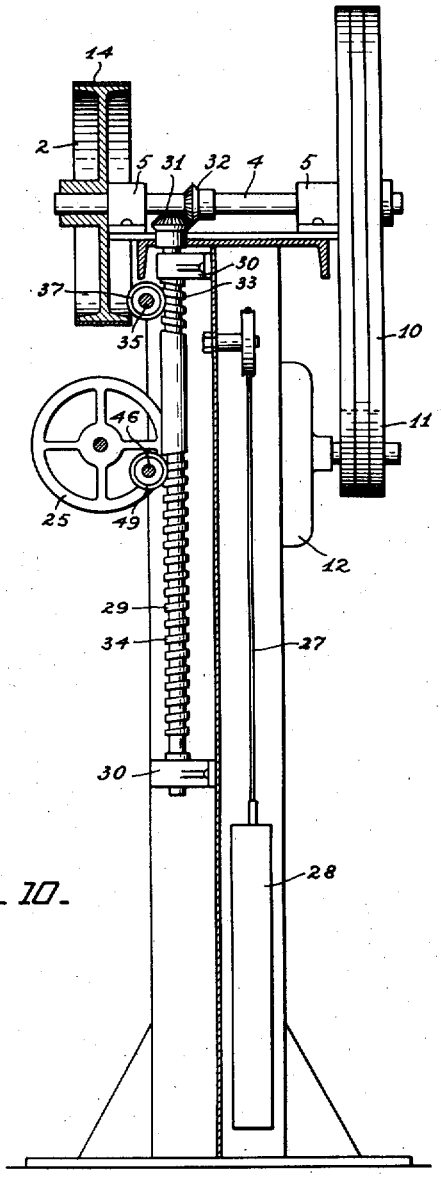
Fig. 3 is a vertical section taken through Fig. 1 on the line 3—3.
Figure 5:
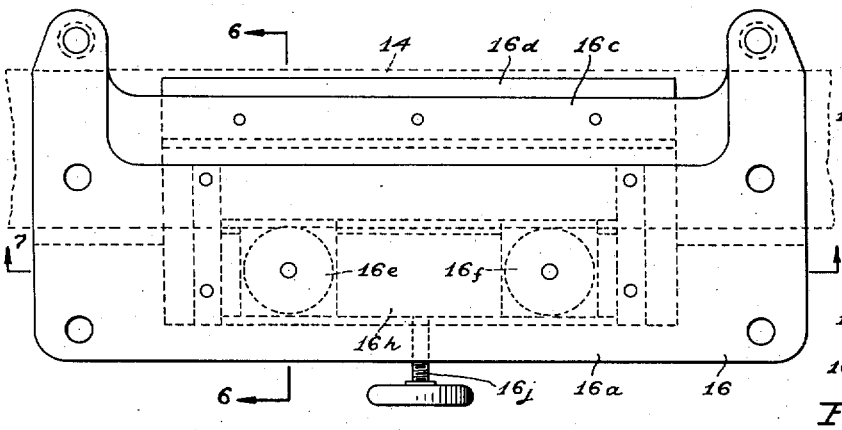
Fig. 5 is an enlarged plan view of the guide for supporting the cutting knife.
Figure 6:
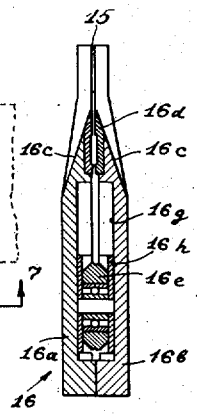
Fig. 6 is a cross section taken through Fig. 5 on the line 6—6.
Figure 7:
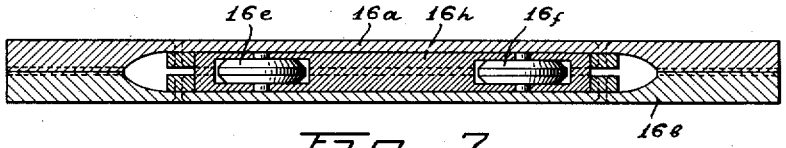
Fig. 7 is a longitudinal section taken through Fig. 5 on the line 7—7.
Figure 9:
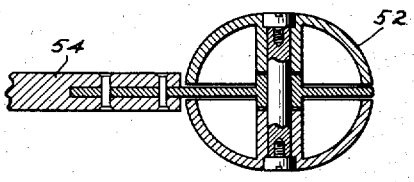
Fig. 9 is an enlarged cross section taken through one of the guides for supporting the tire during the splitting operation.
Figure 8:
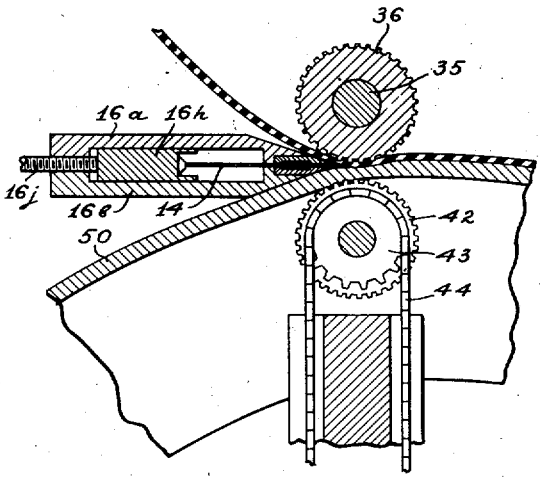
Fig. 8 is an enlarged cross section taken through the pressure rollers and the cutting knife, and showing the method of splitting the tread surface from the tire.

In the modified form of structure shown in Fig. 10, I have indicated a portion of a frame 1' having a slide 18' guided thereon, said slide carrying a lower feed roller 42' on its upper end. The slide 18' is provided with a piston rod 60 thereon reciprocatingly confined in an air cylinder 61 for raising and lowering the said slide member and moving the lower feed roller 36. The method of raising and lowering the slide 18' by means of air pressure, has the advantage over the system of raising said slide by means of a gear and rack, in that it may be operated much faster and eliminates any manual effort in placing the tire under compression.

Having thus described this invention, what I claim and desire to secure by Letters Patent is:

1. An apparatus to cut the curved tread from a full circle tire consisting of a driven roller to be inserted within the tire and to support the tire in hanging position thereon; a driven roller to contact the outer tread surface of the tire, the axes of said driven rollers being parallel on the horizontal plane and in alignment on the vertical plane; means to move the roller on which the tire is supported into contact with the other roller to thereby flatten the tread portion of the tire; a band knife having the cutting edge thereof disposed on a horizontal plane between the rollers; means to advance said knife into engagement with the tread surface of the tire confined between the rollers; and means to drive the band knife and rollers in unison.

2. An apparatus to cut the curved tread from a full circle tire, including a frame having a vertical guide thereon; a slide on said guide; a rack and gear on the guide and slide for raising and lowering the slide on the guide; a bracket on the slide; a horizontally disposed roller on said guide to extend within a tire and to support the tire in hanging position thereon; a shaft journaled on said bracket and guide drivingly connected to said tire supporting roller; and a driven shaft on the frame in driving engagement with said last mentioned shaft.

3. An apparatus to cut the curved tread from a full circle tire, including a frame having a vertical guide thereon; a slide on said guide; a rack and gear on the guide and slide for raising and lowering the slide on the guide; a bracket on the slide; a horizontally disposed roller on said guide to extend within a tire and to support the tire in hanging position thereon; a shaft journaled on said bracket and guide drivingly connected to said tire supporting roller; a shaft journaled on the frame drivingly connected to said second mentioned roller and to the driven shaft on the frame; and a band knife having the cutting edge thereof disposed on a horizontal plane adjacent said second mentioned roller to split the tread surface from a tire when said tread is flattened between said rollers.

4. An apparatus to cut the curved tread from a full circle tire, including a frame having a vertical guide thereon; a slide on said guide; a rack and gear on the guide and slide for raising and lowering the slide on the guide; a bracket on the slide; a horizontally disposed roller on said guide to extend within the tire and to support the tire in hanging position thereon; a sprocket arranged between the ends of said roller; a shaft journaled on said bracket and guide; a chain drivingly connecting said sprocket and shaft; a driven shaft on the frame in driving engagement with said last mentioned shaft; a roller journaled on the frame in parallel and vertical alignment with and above the first mentioned roller; a shaft journaled on the frame drivingly connected to said second mentioned roller and to the driven shaft on the frame; and a band knife having the cutting edge thereof disposed on a horizontal plane adjacent said second mentioned roller to split the tread surface from a tire when said tread is flattened between said rollers.

5. An apparatus to cut the curved tread from a full circle tire, including a frame having a vertical guide thereon; a slide on said guide; a rack and gear on the guide and slide for raising and lowering the slide on the guide; a bracket on the slide; a horizontally disposed roller on said guide to extend within a tire and to support the tire in hanging position thereon; a shaft journaled on said bracket and guide drivingly connected to said tire supporting roller; a driven shaft on the frame in driving engagement with said last mentioned shaft; a roller journaled on the frame in parallel and vertical alignment with and above the first mentioned roller; a shaft journaled on the frame drivingly connected to said second mentioned roller and to the driven shaft on the frame; a band knife having the cutting edge thereof disposed on a horizontal plane adjacent said second mentioned roller to split the tread surface from a tire when said tread is flattened between said rollers; and a pair of guide rollers arranged on the bracket to enter the interior of the tire on diametrically opposite sides thereof and to support the same during the splitting operation.

6. An apparatus to cut the curved tread from a full circle tire, including a frame having a vertical guide thereon; a slide on said guide; a rack and gear on the guide and slide for raising and lowering the slide on the guide; a bracket on the slide; a horizontally disposed roller on said guide to extend within a tire and to support the tire in hanging position thereon; a sprocket arranged between the ends of said roller; a shaft journaled on said bracket and guide; a chain drivingly connecting said sprocket and shaft; a driven shaft on the frame in driving engagement with said last mentioned shaft; a roller journaled on the frame in parallel and vertical alignment with and above the first mentioned roller; a shaft journaled on the frame drivingly connected to said second mentioned roller and to the driven shaft on the frame; a band knife having the cutting edge thereof disposed on a horizontal plane adjacent said second mentioned roller to split the tread surface from a tire when said tread is flattened between said rollers; and a pair of guide rollers arranged on the bracket to enter the interior of the tire on diametrically opposite sides thereof and to support the same during the splitting operation.

7. An apparatus to cut the curved tread from a full circle tire, including a frame having a vertical guide therein, a slide on said guide; a pair of matching driven feed rollers on the frame and slide; means to move the slide with the driven feed roller thereon toward or from the roller on the frame; a band knife having the cutting edge thereof disposed on a plane parallel to the axes of rotation of said rollers and arranged between said rollers; a pair of guide rollers adjustably confined on the slide on diametrically opposite sides thereof to support the tire in a freely rotatable position; and means to drive the feed rollers to advance the tire into contact with the band knife.

8. An apparatus to cut the curved tread from a full circle tire, including a frame having a vertical guide therein, a slide on said guide; a pair of matching driven feed rollers on the frame and slide; means to move the slide with the driven feed roller thereon toward or from the roller on the frame; a band knife having the cutting edge thereof disposed on a plane parallel to the axes of rotation of said rollers and arranged between said rollers; a pair of guide rollers adjustably confined on the slide on diametrically opposite sides thereof to support the tire in a freely rotatable position; toothed mechanism for moving the guide rollers into and from supporting position in the tire; and means to drive the feed rollers to advance the tire into contact with the band knife.

9. An apparatus to cut the curved tread from a full circle tire consisting of a roller to be inserted within the tire and to support the tire in hanging position thereon; a driven roller to contact the outer tread surface of the tire, the axes of said rollers being parallel on the horizontal plane and in alignment on the vertical plane; means to move the roller on which the tire is supported towards the other roller to thereby flatten the tread portion of the tire; a knife having the cutting edge thereof disposed on a horizontal plane between the rollers, and means to drive the knife and one of the rollers in unison.

10. An apparatus to cut the curved tread from a full circle tire, including a frame having a vertical guide thereon; a slide on said guide; means for raising and lowering the slide on the guide; a bracket on the slide; a horizontally disposed roller on said guide to extend within a tire and to support the tire in hanging position thereon; a driven shaft on the frame; a roller journaled on the frame in parallel and vertical alignment with and above the first mentioned roller; a shaft journaled on the frame drivingly connected to said second mentioned roller and to the driven shaft on the frame; and a knife having the cutting edge thereof disposed on a horizontal plane adjacent said second mentioned roller to split the tread surface from a tire when said tread is flattened between said rollers.

11. An apparatus to cut the curved tread from a full circle tire, including a frame having a vertical guide thereon; a slide on said guide; means for raising and lowering the slide on the guide; a bracket on the slide; a horizontally disposed roller on said guide to extend within a tire and to support the tire in hanging position thereon; a driven shaft on the frame; a roller journaled on the frame in parallel and vertical alignment with and above the first mentioned roller; a shaft journaled on the frame drivingly connected to said second mentioned roller and to the driven shaft on the frame; a knife having the cutting edge thereof disposed on a horizontal plane adjacent said second mentioned roller to split the tread surface from a tire when said tread is flattened between said rollers; and a pair of guide rollers arranged on the bracket to enter the interior of the tire on diametrically opposite sides thereof and to support the same during the splitting operation.

12. An apparatus for cutting the tread from a full circle tire comprising a roller supported in a position to be disposed within the tire, a second roller arranged to contact the outer tread surface of the tire, said rollers being parallel and the axes thereof being in vertical alignment, means for moving one of said rollers relative to the other to flatten the portion of the tire disposed between them, a knife for forming a flat cut between the rollers and parallel to their axes, the surface cut by the knife becoming curved and merging gradually into the uncut surface of the tire as the same assumes its normal shape upon removal of the tire from between the rollers and means for driving one of said rollers and said knife in unison.

13. An apparatus for cutting the tread from a full circle tire comprising a roller supported in a position to be disposed within the tire; a second roller arranged to contact the outer surface of the tire, said rollers being parallel and the axes thereof being in vertical alignment, means for moving one of said rollers relative to the other to flatten that portion of the tire disposed between them, a knife having a straight cutting edge disposed between the rollers and parallel to their axes; and means for simultaneously driving the rollers to advance the tire and for moving the knife to form a straight cut at the portion of the tire between the rollers, said tire assuming its normal shape upon removal of the tire from between the rollers, the cut portion thereby assuming the normal curved contour with gradually tapered marginal edges.

14. An apparatus for cutting the tread from a full circle tire comprising a roller arranged to be positioned within the tire; a second roller parallel to the first and engageable with the outer surface of the tire; means to effect relative movement of the rollers toward each other to compress that portion of the tire immediately between them to a substantially flat position; means for driving one of the rollers to advance the tire between them; and a knife having a straight cutting edge engaging and severing the tire tread as it passes between the rollers in a plane parallel to the axes of the rollers and means for driving one of said rollers and said knife in unison.

GEORGE F. CONNELLY.